UNITED STATES PATENT OFFICE.

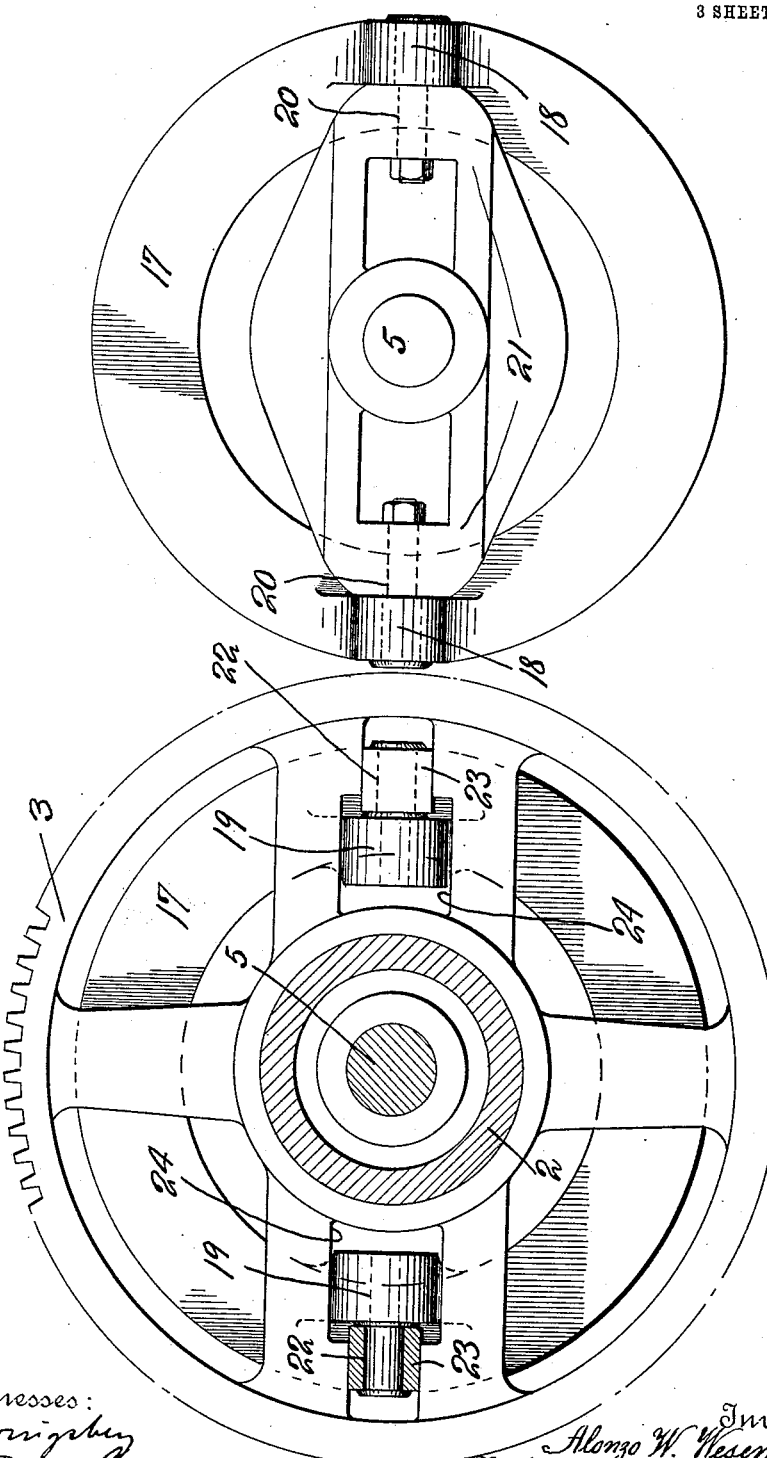

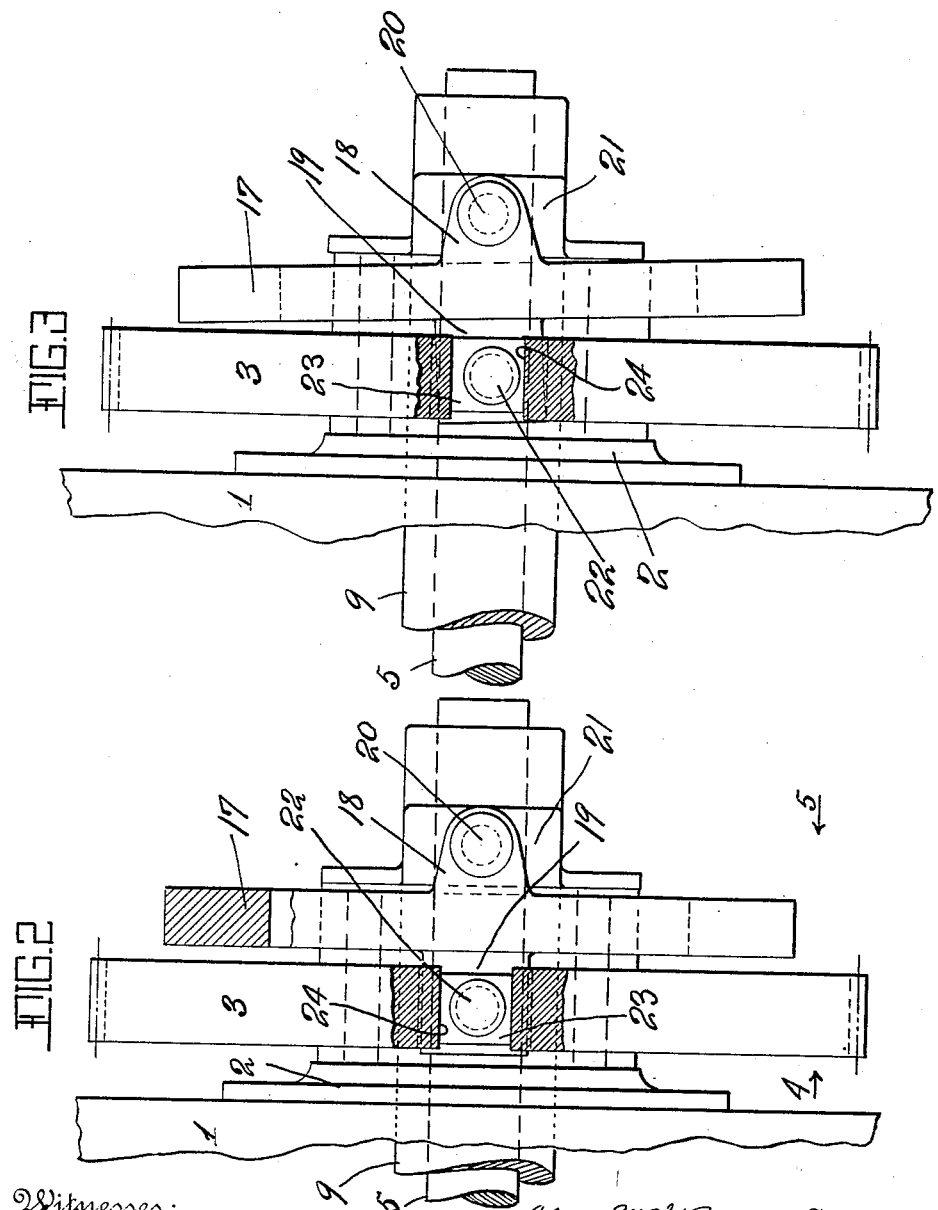

ALONZO W. WESEMAN, OF PLAINFIELD, NEW JERSEY, ASSIGNOR TO WALTER SCOTT, OF PLAINFIELD, NEW JERSEY; ISABELLA SCOTT AND DAVID JOHN SCOTT EXECUTORS OF SAID WALTER SCOTT, DECEASED.

TRANSMISSION MECHANISM.

1,041,927. Specification of Letters Patent. Patented Oct. 22, 1912.

Application filed February 1, 1907. Serial No. 355,246.

*To all whom it may concern:*

Be it known that I, ALONZO W. WESEMAN, a citizen of the United States of America, and a resident of Plainfield, county of Union, State of New Jersey, have invented certain new and useful Improvements in Transmission Mechanism, of which the following is a specification.

The present invention relates generally to transmission mechanism, and has more particularly reference to a compensating connecting means, that is: a device which will transmit motion at a uniform speed from a driving to a driven member, whatever the relation of their centers—be they eccentric, concentric or constantly varying.

The chief object of the invention resides in producing a device of this character that will lend itself readily to embodiment in connection with the reciprocating bed motion of a printing machine of the bed and cylinder type.

Other objects will appear as the specification proceeds.

The specific form of compensating connecting means disclosed herein is broadly new—and is so claimed, and consists in the following arrangement. Interposed between a driving and a driven member is a connecting means pivotally supported by one of said members on fixed pivots transversely of the axis of rotation, and supported on its other side in the same plane by means of pivots mounted in sliding boxes arranged to move radially and laterally in slots on the other member. Obviously this form of compensating connecting means may be employed for any purpose where a flexible coupling is used such as on the main drive of an automobile where the jolting of the vehicle frequently offsets the centers of the driving and driven members. The invention, however, is not to be limited to the precise means shown, or the particular forms followed, as it will be obvious to any one skilled in the art that variations may be made without departing from the legitimate and intended scope of the invention.

In the accompanying drawings, the invention is embodied in a concrete and preferred form, in which—

Figure 1 is a plan view of the parts comprising the bed motion of a printing machine, partly in section and with portions removed and cut away to facilitate illustration, embodying the invention. Fig. 2 is an end elevation, partly in section, of the parts comprising the compensating connecting means, showing the driving and driven members concentric. Fig. 3 is a view similar to Fig. 2 showing the driving and driven members eccentric. Fig. 4 is a side view partly in section of the parts shown in Figs. 2 and 3, looking in the direction of the arrow 4, Fig. 2. Fig. 5 is a view similar to Fig. 4, but looking in the direction of the arrow 5, Fig. 2.

Similar characters of reference indicate corresponding parts in the several views.

1 indicates the side framing of a printing machine of any suitable construction.

2 indicates a fixed hollow bushing carried thereby on which is mounted the driving gear 3. This gear constitutes in this instance the driving member and may be operated from any source—such as by means of the pinion 4. Extending through the hollow hub and from the side framing in underneath the machine is the shaft 5 which in this instance is the driven member. At its inner end this shaft carries the gear 6 adapted to engage with the bed racks 7 and 8 in a well known manner. Any suitable means may be employed for raising and lowering the shaft, but in the present instance is shown a sleeve 9, in which the shaft is supported, pivoted at 10 and provided with the arm 11 carrying the anti-friction roll 12 adapted to engage with the cam 13. The rotation of the cam causes the sleeve 9 to be rocked on its pivots thereby raising and lowering the shaft. This cam may be driven from the gear 3 by means of the train of gears 14, 15 and 16.

The compensating connecting means for transmitting uniform motion from the driving gear to the shaft are as follows: 17 indicates a disk or ring provided with the projections 18 and 19 which extend from its opposite faces but in the same plane. In the present instance there are two sets of these projections. The projections 18 are fixedly pivoted at 20 transversely of the axis of rotation on the radial arms 21 carried by the shaft 5. The projections 19 are pivoted at 22 in the sliding boxes or guides 23, which latter are adapted to slide radially and laterally in the complementary radial slots 24 on the driving gear.

The operation of the device is as follows: When the shaft 5 and the driving gear are concentric, which in the present construction they would be when the rack engaging gear is in one of its rack engaging positions, the compensating connecting means will remain relatively stationary and will simply follow the rotation of the driving member. This is indicated in Fig. 2. When, however, the shaft 5 and the driving gear are eccentric with relation to each other as shown in Fig. 3, then the connecting disk will be oscillated around the pivots 20, while the sliding boxes will move radially, and, owing to the oscillation of the disk, also laterally in the slots of the gear. By this means uniform rotation is imparted to the shaft 5 whatever its relation to the driving gear.

What is claimed is:

1. Transmission mechanism comprising a shaft carrying a gear and constituting a driven member, means for raising and lowering said shaft, a driving member, compensating means pivotally supported transversely to the axis of rotation of one of said members, and guides pivotally mounted in the compensating means, engaging the other member and capable of radial movement with respect thereto.

2. A rotating driving member, a rotating driven member, one of said members being provided with radial slots, connecting means pivotally supported on the other of said members, and guides pivotally supported on the connecting means and adapted to extend into the slots aforesaid, and to slide radially and laterally therein.

3. A rotating driving member, a rotating driven member, the driving member being provided with radial slots, connecting means pivotally supported on the driven member, and guides pivotally supported on the connecting means and adapted to extend into the slots aforesaid and to slide radially and laterally therein.

4. A rotating driving member, a rotating driven member, one of said members being provided with radial slots, connecting means pivotally supported transversely to the axis of rotation on the other of said members, and guides pivotally supported on the connecting means and adapted to extend into the slots aforesaid and to slide radially and laterally therein.

5. A rotating driving member, a rotating driven member, the driving member being provided with radial slots, connecting means pivotally supported transversely to the axis of rotation on the driven member, and guides pivotally supported on the connecting means and adapted to extend into the slots aforesaid and to slide radially and laterally therein.

6. A rotating driving member, a rotating driven member, one of said members being provided with radial slots, connecting means pivotally supported on the other of said member, guides pivotally supported on the connecting means and adapted to extend into the slots aforesaid and to slide radially and laterally therein, and means for intermittently offsetting the axes of the driving and driven members.

7. A rotating driving member, a rotating driven member, the driving member being provided with radial slots, connecting means pivotally supported on the driven member, guides pivotally supported on the connecting means and adapted to extend into the slots aforesaid and to slide radially and laterally therein, and means for intermittently offsetting the axes of the driving and driven members.

8. A rotating driving member, a rotating driven member, one of said members being provided with radial slots, connecting means pivotally supported transversely to the axis of rotation on the other of said members, guides pivotally supported on the connecting means and adapted to extend into the slots aforesaid, and to slide radially and laterally therein, and means for intermittently offsetting the axes of the driving and driven members.

9. A rotating driving member, a rotating driven member, the driving member being provided with radial slots, connecting means pivotally supported transversely to the axis of rotation on the driven member, guides pivotally supported on the connecting means and adapted to extend into the slots aforesaid, and to slide radially and laterally therein, and means for intermittently offsetting the axes of the driving and driven members.

10. The combination with rotating driving and driven members, of compensating means pivotally supported transversely to the axis of rotation of one of said members, and guides pivotally mounted on the compensating means, engaging the other of said members and capable of radial movement with respect thereto.

Signed at New York city this 15th day of January 1907.

ALONZO W. WESEMAN.

Witnesses:
 AXEL V. BEEKEN,
 DAVID J. SCOTT.